(12) United States Patent
Nakamura

(10) Patent No.: US 8,340,390 B2
(45) Date of Patent: Dec. 25, 2012

(54) METHOD AND APPARATUS FOR MAGNETIC CHARACTER RECOGNITION

(75) Inventor: Hiroshi Nakamura, Nagano (JP)

(73) Assignee: Nidec Sankyo Corporation (JP)

( * ) Notice: Subject to any disclaimer, the term of this patent is extended or adjusted under 35 U.S.C. 154(b) by 880 days.

(21) Appl. No.: 12/474,840

(22) Filed: May 29, 2009

(65) Prior Publication Data

US 2009/0324106 A1 Dec. 31, 2009

(30) Foreign Application Priority Data

May 30, 2008 (JP) ................................. 2008-143524

(51) Int. Cl.
*G06K 9/00* (2006.01)
(52) U.S. Cl. ........... 382/139; 382/181; 382/192; 702/66
(58) Field of Classification Search .................. 382/139, 382/181, 192, 194, 286; 702/66, 70, 71, 702/73
See application file for complete search history.

(56) References Cited

U.S. PATENT DOCUMENTS

| | | | | |
|---|---|---|---|---|
| 4,053,737 A * | 10/1977 | Lafevers et al. | ............... | 235/449 |
| 5,524,063 A * | 6/1996 | Henrot | ........................... | 382/139 |
| 6,674,786 B1 * | 1/2004 | Nakamura et al. | ............ | 375/340 |
| 6,956,962 B1 * | 10/2005 | Hayosh | ........................ | 382/139 |
| 6,986,464 B2 * | 1/2006 | Takiguchi et al. | ............ | 235/449 |
| 2005/0286752 A1 * | 12/2005 | Takiguchi | ..................... | 382/139 |

FOREIGN PATENT DOCUMENTS

| JP | 2001-351062 A | 12/2001 |
|---|---|---|
| JP | 2005-157982 A | 6/2005 |

* cited by examiner

*Primary Examiner* — John Strege
(74) *Attorney, Agent, or Firm* — Cantor Colburn LLP

(57) ABSTRACT

A method for magnetic character recognition may include: a peak detection process for detecting peak positions in a regeneration waveform; a character pitch measuring process for calculating an average character width and an average character period of each character according to a detection result of the peak detection process; a character segmentation process for calculating a peak interval array for each character according to the average character period; a peak searching process for searching for peak positions by using searching conditions, which are different from what the character segmentation process applies, on each waveform part segmented through the character segmentation process; a peak count evaluation process for choosing either a result of the character segmentation process or a result of the peak searching process, depending on whether the number of peaks in the waveform part agrees with a prescribed number of peaks; and a character determining process for a matching operation on a peak interval array, according to the peak interval array determined through the peak count evaluation process, to determine the character.

7 Claims, 16 Drawing Sheets

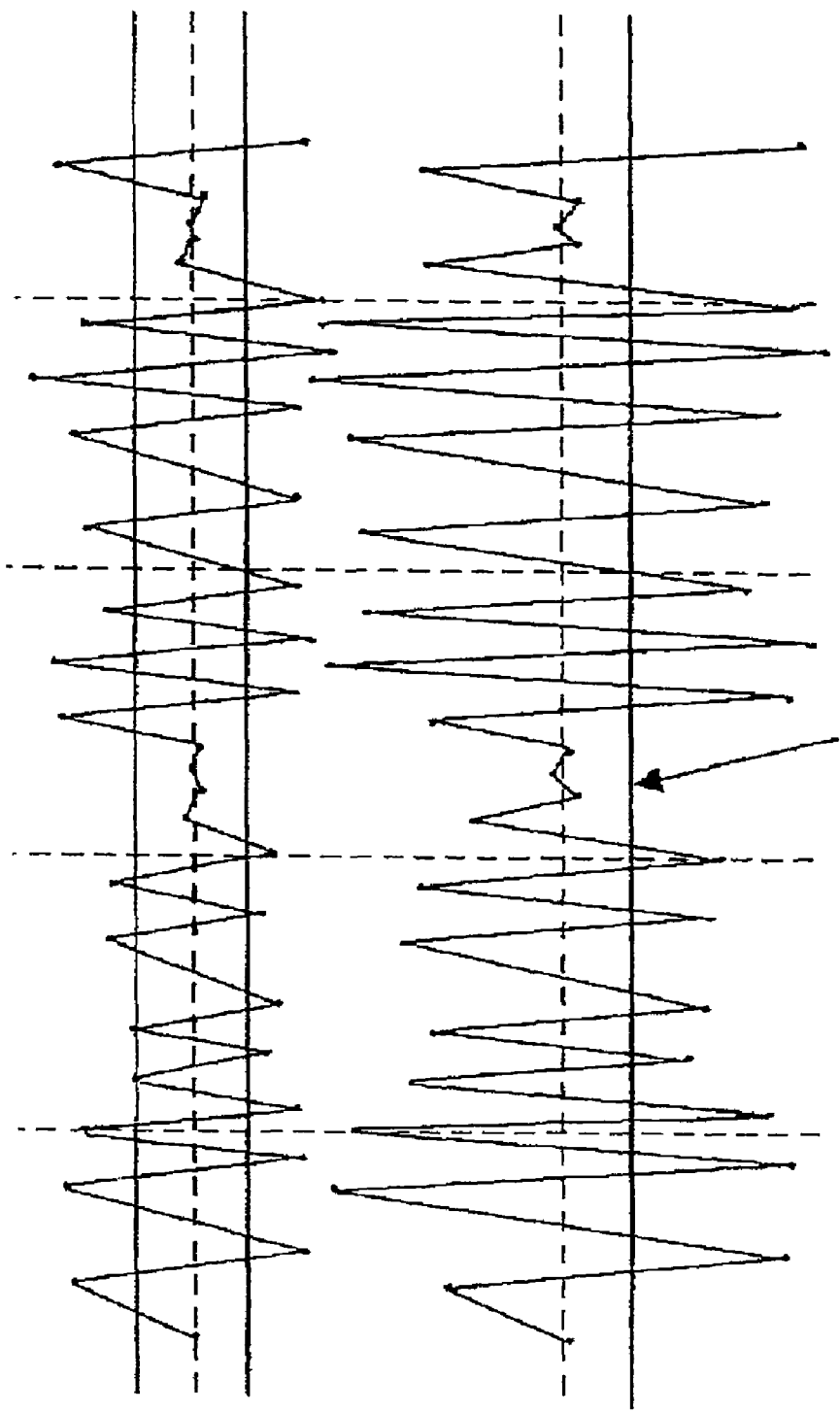

METHOD AND APPARATUS FOR MAGNETIC CHARACTER RECOGNITION

CROSS-REFERENCE TO RELATED APPLICATION

The present application claims priority under 35 U.S.C. §119 to Japanese Application No. 2008-143524 filed May 30, 2008, the contents of which are incorporated herein by reference.

FIELD OF THE INVENTION

At least an embodiment of the present invention relates to a method and an apparatus for magnetic character recognition for reading a character string printed with magnetic ink characters and generating a regeneration waveform for character recognition, and particularly to a technology for enhancing the accuracy of character recognition.

BACKGROUND

Conventionally, there have been disclosed various methods in which a part of a medium surface, where magnetic ink characters (MICR characters) are printed, is read by using a magnetic head so as to obtain a magnetic regeneration signal for the purpose of character recognition. The magnetic ink characters (MICR characters) are used for checks and the like to be used in financial facilities. Character types thereof typically include E13B and CMC7, and the character types are standardized by ISO 1004 and so on.

At the initial stage in the history of development of the technology for recognizing MICR characters, a major method for character recognition involved reading a magnetic character line by using a magnetic head, inputting a waveform of the magnetic regeneration signal into a logical circuit, and then recognizing the character according to characteristics of a peak position and an output level in the waveform of the magnetic regeneration signal. However, in association with technical advancement of the performance of microprocessors as well as enhancement of memory units in relation with their high-speed operation and large capacity, character recognition by processing a magnetic signal with software has been increasing these years. Furthermore, examples of character recognition include some cases in which not only a magnetic signal but also an image captured by scanning a medium are used together.

In a disclosed method in which a magnetic signal is used, peak intervals in a waveform of a magnetic regeneration signal of a character are determined; and then, according to a combination pattern of the peak intervals, the waveform is correlated with a character having a combination pattern of the peak intervals (For example, refer to Patent Document 1 and Patent Document 2).

[Patent Document 1]
Japanese Unexamined Patent Publication (Kokai) No. JP2001-351062

[Patent Document 2]
Japanese Unexamined Patent Publication (Kokai) No. JP2005-157982

However, among checks and so on used practically in the marketplace, some include poorly printed magnetic ink characters even though the characters are still within an allowable range. Therefore, it is required that the technology of character recognition shall recognize those characters within such a border range, being free from any false character recognition.

To describe more in detail, magnetic ink characters being practically used include variations, depending on qualities of magnetic ink, a printing machine, irregularities of medium transfer speed and magnetic properties of a regeneration magnetic head and a magnetizing head. Eventually there arise alterations in the magnetic ink characters; such as a high magnetic force, a low magnetic force, a thick-lined character, a thin-lined character, tilt, and so on.

Furthermore, depending on using condition and storage condition of a check, there may also arise other alterations in the characters, such as having an opening, an unclear character, and a blurring character, etc. so that waveforms of magnetic regeneration signals are deformed in various ways. Especially, depending on the printing machine, sometimes the characters may be printed, possibly having their character pitch and character width that significantly deviate from the standards. In such a case, accuracy of the magnetic character recognition may be impaired. From that viewpoint, in the case of Patent Document 2 described above, a determination frame having a constant length is specified for segmenting a character out of a waveform of a magnetic regeneration signal. However, when the character pitch is unexpectedly long, such a method is likely to make a mis-determination on character boundary positions and probably lead to false recognition.

Thus, at least an embodiment of the present invention may provide a method and an apparatus for magnetic character recognition for recognizing magnetic characters with high accuracy, even when the magnetic ink characters are printed, having their character pitch and character width that are unusual.

To solve the problem identified above, at least an embodiment of the present invention may provide any or all of the following aspects:

(1) A method of magnetic character recognition through reading a character string by using a magnetic head, and creating a regeneration waveform for the character recognition; the character string including a plurality of magnetic characters printed with magnetic ink; and the method of magnetic character recognition including: a peak detection process for detecting peak positions in the regeneration waveform; a character pitch measuring process for calculating an average character width and an average character period of each character according to a detection result of the peak detection process; a character segmentation process for calculating a peak interval array for each character according to the average character period; a peak searching process for searching for peak positions by using searching conditions, which are different from what the character segmentation process applies, on each waveform part segmented through the character segmentation process; a peak count evaluation process for choosing either a result of the character segmentation process or a result of the peak searching process, depending on whether the number of peaks in the waveform part agrees with a prescribed number of peaks; and a character determining process for a matching operation on a peak interval array, according to the peak interval array determined through the peak count evaluation process, to determine the character.

According to at least an embodiment of the present invention; in the method of magnetic character recognition reading a character string by using a magnetic head, and creating a regeneration waveform for the character recognition, wherein the character string including a plurality of magnetic characters printed with magnetic ink; peak positions in the regeneration waveform are detected, an average character width and an average character period of each character are calculated, a peak interval array is calculated according to the average character period to segment a character, peak positions are (re-)searched by using searching conditions which are different from what the character segmentation process applies, and a peak interval array to be used for character determination is chosen by taking notice of the number of peaks in each waveform part. Therefore, the accuracy of character recognition can be improved.

Namely, the average character width and the average character period of the regeneration waveform are calculated beforehand. Then, between the peak interval array calculated according to the average character period and the other peak interval array obtained by searching operation and calculation under searching conditions, which are different from those used for calculating the former peak interval array, a more suitable one is chosen by taking notice of the number of peaks in the waveform part. Therefore, it is possible to recognize magnetic characters with high accuracy, even when the magnetic ink characters are printed, having their character pitch and character width that are unusual owing to uncertainties in printing condition.

(2) The method of magnetic character recognition: wherein the character pitch measuring process calculates the average character width and the average character period by calculating peak difference values of the regeneration waveform and using a histogram of the peak difference values.

According to at least an embodiment of the present invention; the character pitch measuring process calculates peak difference values of the regeneration waveform, and then calculates the average character width and the average character period by using a histogram of the peak difference values. Accordingly, the accuracy of character recognition can be improved easily. Furthermore, making use of difference processing generally, such as calculating peak difference values, can prevent programs from becoming heavy-laded.

(3) The method of magnetic character recognition: wherein the character pitch measuring process calculates the average character width and the average character period by calculating the peak difference values of the regeneration waveform and the cumulative frequency distribution thereof, and calculating a flatness of the cumulative frequency distribution.

According to at least an embodiment of the present invention; the character pitch measuring process calculates the peak difference values of the regeneration waveform and the cumulative frequency distribution thereof, and then calculates the average character width and the average character period by calculating a flatness of the cumulative frequency distribution. Accordingly, it becomes possible to separate signal elements from noise elements more accurately so as to further enhance the accuracy of magnetic character recognition.

(4) The method of magnetic character recognition: wherein the peak count evaluation process chooses a result of the peak searching process if the number of peaks in the waveform part agrees with a prescribed number of peaks, and the peak count evaluation process chooses a result of the character segmentation process if the number of peaks in the waveform part does not agree with the prescribed number of peaks.

According to at least an embodiment of the present invention; the peak count evaluation process chooses a result of the peak searching process or the character segmentation process, when the number of peaks in the waveform part agrees with a prescribed number of peaks or not, respectively. Therefore, it becomes possible to avoid any unnecessary chance of recognition impossible for the character in the course of operation of character recognition.

(5) An apparatus of magnetic character recognition through reading a character string by using a magnetic head, and creating a regeneration waveform for the character recognition; the character string including a plurality of magnetic characters printed with magnetic ink; and the apparatus of magnetic character recognition including: a peak detection section for detecting peak positions in the regeneration waveform; a character pitch measuring section for calculating an average character width and an average character period of each character according to a detection result of the peak detection section; a character segmenting section for calculating a peak interval array for each character according to the average character period; a peak searching section for searching for peak positions by using searching conditions, which are different from what the character segmenting section applies, on each waveform part segmented through the character segmenting section; a peak count evaluating section for choosing either a calculation result of the character segmenting section or a search result of the peak searching section, depending on whether the number of peaks in the waveform part agrees with a prescribed number of peaks; and a character determining section for a matching operation on a peak interval array, according to the peak interval array determined through the peak count evaluating section, to determine the character.

According to at least an embodiment of the present invention; the apparatus of magnetic character recognition includes: a peak detection section for detecting peak positions in the regeneration waveform; a character pitch measuring section for calculating an average character width and an average character period of each character; a character segmenting section for calculating a peak interval array for each character; a peak searching section for searching for peak positions by using searching conditions, which are different from what the character segmenting section applies; a peak count evaluating section for choosing either a calculation result of the character segmenting section or a search result of the peak searching section; and a character determining section for a matching operation on a peak interval array to determine the character. Therefore, an optimal peak interval array can be chosen through the peak count evaluating section and it is possible to recognize magnetic characters with high accuracy, even when the magnetic ink characters are printed, having their character pitch and character width that are unusual.

ADVANTAGEOUS EFFECT

According to at least an embodiment of the present invention; even when magnetic characters are printed with their character pitch and character width that deviate from the standards (on a large scale, for example), an average character width can be chosen and/or determined more correctly so that the magnetic characters are recognized with high accuracy. Furthermore, using a histogram or a cumulative frequency distribution of peak difference values makes it possible to separate signal elements from noise elements more accurately at the time of determining the average character width so as to further enhance the accuracy of magnetic character recognition.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 6A and 6B show a concrete example of a series of peaks "Pk".

DESCRIPTION OF THE PREFERRED EMBODIMENT

A preferred embodiment of the present invention is described below with reference to the accompanying drawings.
(Magnetic Character Recognition Apparatus)

Figure 1:
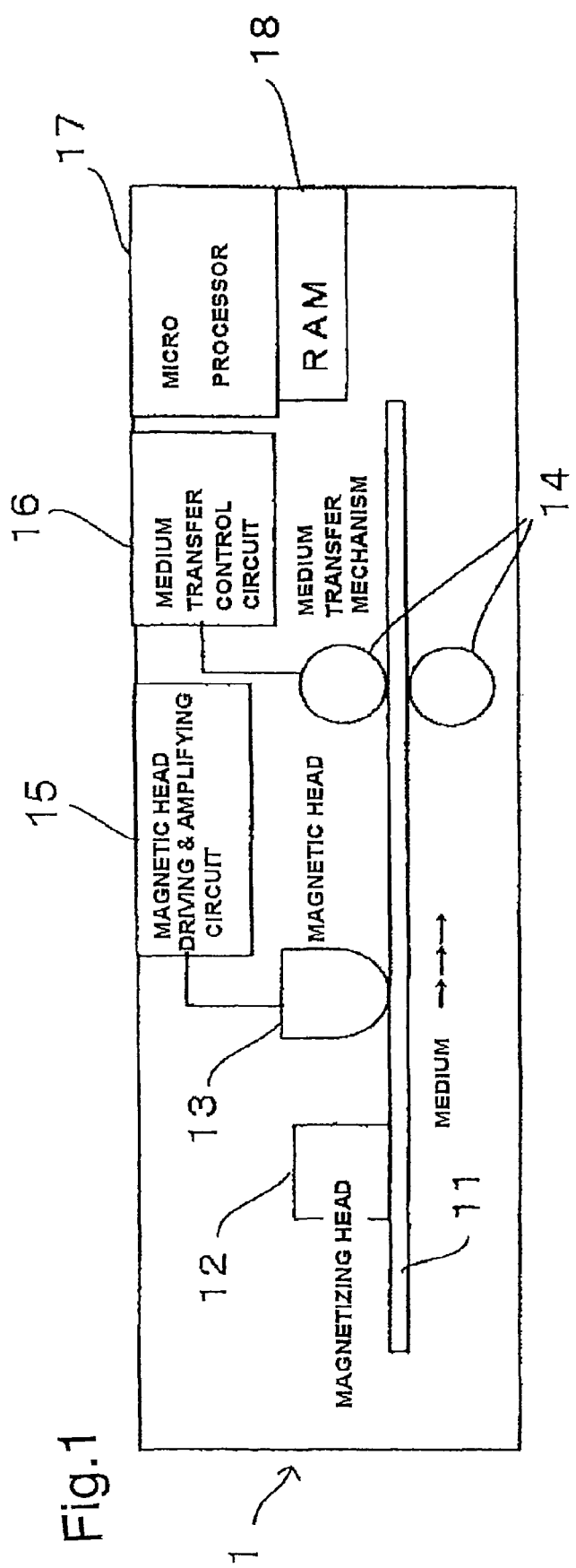
FIG. 1 is a schematic view of showing a structure of a magnetic character recognition apparatus in accordance with an embodiment of the present invention.

FIG. 1 is a schematic view of showing a structure of a magnetic character recognition apparatus 1 in accordance with an embodiment of the present invention. In the embodiment of the present invention, a check reader provided with an MICR function is taken up for explanation. FIG. 1 illustrates a configuration of a section mainly relating to MICR processing of the magnetic character recognition apparatus 1 in accordance with the embodiment of the present invention.

In FIG. 1, the magnetic character recognition apparatus 1 includes a paper medium transfer path 11, a magnetizing head 12 for re-magnetizing MICR characters (i.e., magnetic characters printed by using magnetic ink), a magnetic head 13 for detecting magnetism of the MICR characters, rollers 14 for transferring the paper medium, a magnetic head driving & amplifying circuit 15, a medium transfer control circuit 16, a micro processor 17, and a RAM 18. The magnetic head 13 and the rollers 14 are controlled by the magnetic head driving & amplifying circuit 15 and the medium transfer control circuit 16, respectively. Furthermore, the magnetic head driving & amplifying circuit 15 and the medium transfer control circuit 16 are operated according to commands from the micro processor 17 such as a CPU, etc., while the micro processor 17 uses the RAM 18 as a working memory. Incidentally, illustrating a ROM is omitted in the figure.

Having been inserted into the paper medium transfer path 11, a check (i.e., an information data recording medium) is transferred by the rollers 14, and passes by the magnetizing head 12 and the magnetic head 13. The magnetizing head 12 re-magnetizes MICR characters printed on the check, while the magnetic head 13 detects magnetism of the MICR characters re-magnetized by the magnetizing head 12.

A regeneration waveform is generated out of the MICR characters read out by the magnetic head 13. Then, the generated MICR regeneration waveform is digitalized and saved in an MICR waveform memory (for example the RAM 18). By using the MICR regeneration waveform data saved in the MICR waveform memory, magnetic character recognition processing is carried out in the microprocessor 17 built in the magnetic character recognition apparatus 1. Details of the magnetic character recognition are explained in a section of "Magnetic character recognition method" described later.

In the present embodiment, the magnetic character recognition is carried out in the microprocessor 17 built in the magnetic character recognition apparatus 1. However, the MICR regeneration waveform data may be transferred to a higher-level apparatus (such as an ATM), in which the magnetic character recognition is carried out. Furthermore, a one-dimensional image pickup device of a close coupling type for reading an image on a surface of a check may be placed at either of an upper side and a lower side of the paper medium transfer path 11 or even at both the sides. Still further, a printing block for printing a prescribed matter on the surface of the check may also be placed.

Figure 2:
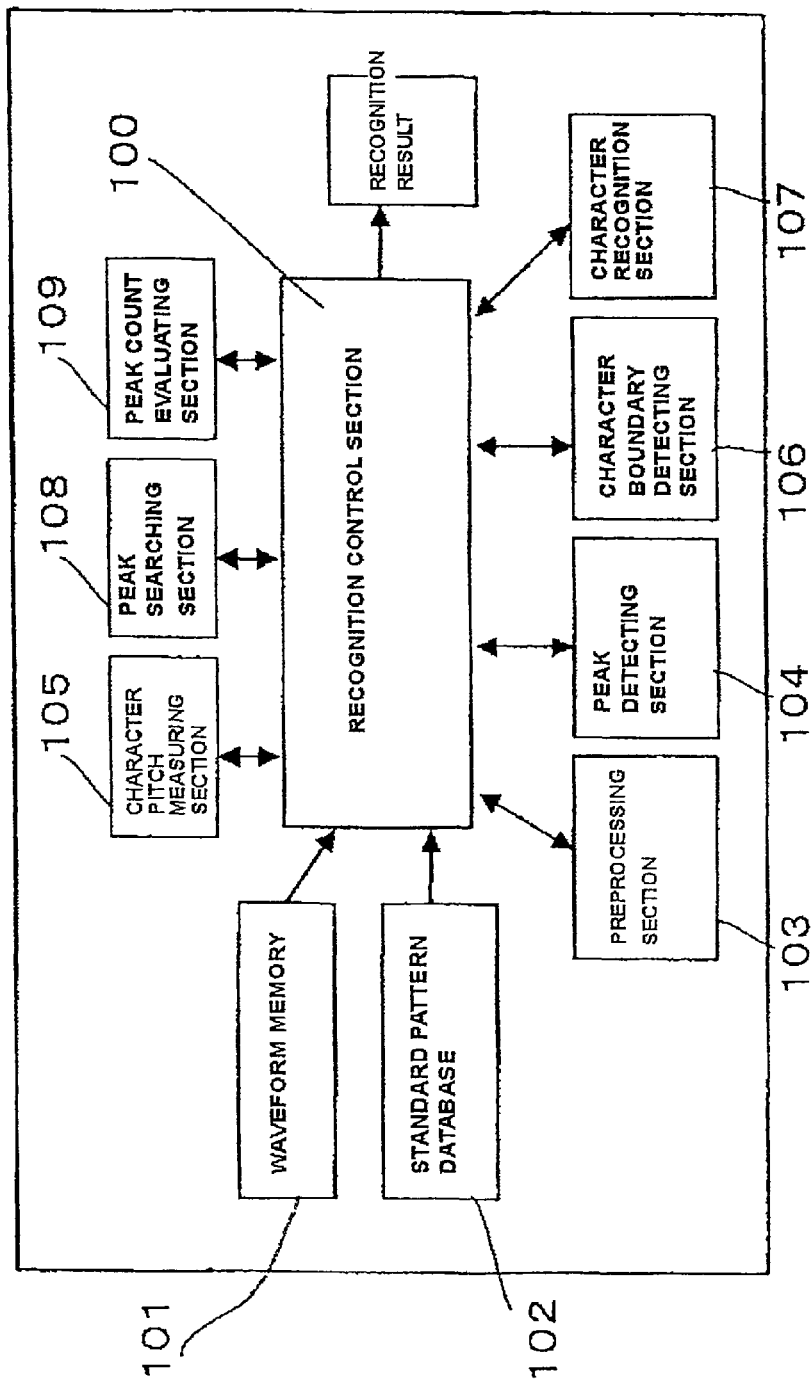
FIG. 2 is a block diagram showing an electrical configuration of the magnetic character recognition apparatus in accordance with the embodiment of the present invention.

FIG. 2 is a block diagram showing an electrical configuration of the magnetic character recognition apparatus 1 in accordance with the embodiment of the present invention; illustrating a configuration of a section mainly relating to MICR processing.

In FIG. 2, the magnetic character recognition apparatus 1 includes a recognition control section 100, a (MICR) waveform memory 101 (such as an EEPROM), a standard pattern database 102 (such as an EEPROM), a preprocessing section 103, a peak detecting section 104, a character pitch measuring section 105, a character boundary detecting section 106, a character determining section 107, a peak searching section 108, and a peak count evaluating section 109.

The MICR regeneration waveform saved in the MICR waveform memory 101 is processed at first in the preprocessing section 103 for removing noise from an entire part of the MICR regeneration waveform through smoothing, in order to generate a shaped waveform from which noise has already been removed.

Subsequently, all peak information data included in the shaped MICR regeneration waveform are detected in the peak detecting section 104. Then, the peak information data such as a polarity (positive or negative), an intensity, a steeple position (a peak position), and so on of each peak are saved. At the time, any peak provided with a peak intensity, which does not reach a predefined value, is excluded from the data.

Then, in the character pitch measuring section 105, an average character width and an average character period are calculated according to the detection result of the peak detecting section 104. The way of calculation is concretely described later in the section of "Magnetic character recognition method".

Next, according to the peak information data (especially, the average character period), a peak interval array for each character is calculated in the character boundary detecting section 106. Namely, a forefront peak of each magnetic ink character is detected from the MICR regeneration waveform. Then, a character boundary position for each character is determined, and a character waveform corresponding to each character is segmented.

Subsequently, in the peak searching section 108, peak position searching is carried out by using searching conditions, which are different from what the character boundary detecting section 106 applies, on each waveform part (a waveform part for each one character) segmented by the character boundary detecting section (character segmenting section) 106. Then, depending on whether the number of peaks in each waveform part agrees with a prescribed number of peaks or not, either the calculation result of the character boundary detecting section (character segmenting section) 106 or the search result of the peak searching section 108 is chosen in the peak count evaluating section 109.

Finally, in the character determining section 107, the number of peaks included in the character waveform is counted in accordance with a prescribed threshold. Furthermore, the number of peaks counted is compared with the standard number of peaks included in the standard character waveform, and an adjustment is so made as to equalize these two numbers of peaks. Then, in accordance with the above number of peaks that agrees with the standard number of peaks; by using the array pattern of a plurality of intervals between peaks that are included in the segmented character waveform, array data of peak intervals (peak interval array) is generated. Then, the array data of peak intervals is compared with the standard array data of peak intervals (standard peak interval array) stored in the standard pattern database 102 for magnetic character recognition.

Incidentally, the standard pattern database 102 described above is a memorizing means such as an EEPROM, a flash memory, etc., which stores the standard array data of peak intervals (standard array of peak intervals). Concretely to describe, the standard pattern database 102 stores an array pattern of a plurality of intervals between peaks that are included in a standard character waveform of each magnetic character as standard array data of peak intervals; in accordance with a standard waveform that is used as a datum for reading a character string, including a plurality of magnetic characters printed with magnetic ink, by a magnetic head. Furthermore, the standard pattern database 102 stores not only the standard array data of peak intervals but also the standard numbers of peaks included in the standard character waveforms.

Generally, in the standard array data of peak intervals stored in the standard pattern database 102; all peaks that exceed the prescribed threshold are detected in the extent from the forefront peak position of the character to that of the next character, and distances between peaks are calculated to form array data (vector) of distances between peaks. The vector of distances between peaks has a specific pattern for each character, and standard data for each character is prepared in the check reader. Then, the generated vector of distances between peaks is compared one by one with the standard pattern vector (which is a vector of the standard array data of peak intervals); and consequently a character having high similarity, i.e., a character corresponding to array data of peak intervals having high coincidence, can be correlated with the character that the extent expresses (can be identified as a read character).

Furthermore, the magnetic character recognition apparatus 1 in accordance with the present embodiment may be equipped with other database storing standard array data of peak intervals compatible with various factors of deformation in addition to the standard pattern database 102. Namely; when no character can be identified uniquely at an early stage, a comparison may be made with a second or third database.

Moreover, the recognition control section 100 is mainly composed of the micro processor 17 software-wise. Meanwhile, other sections (including the preprocessing section 103, the peak detecting section 104, the character pitch measuring section 105, the character boundary detecting section 106, the character determining section 107, the peak searching section 108, and the peak count evaluating section 109) are composed software-wise of electric components such as, the micro processor 17, the waveform memory 101, the standard pattern database 102, the RAM 18, and a ROM not illustrated.

(Magnetic Character Recognition Method)

Figure 3:
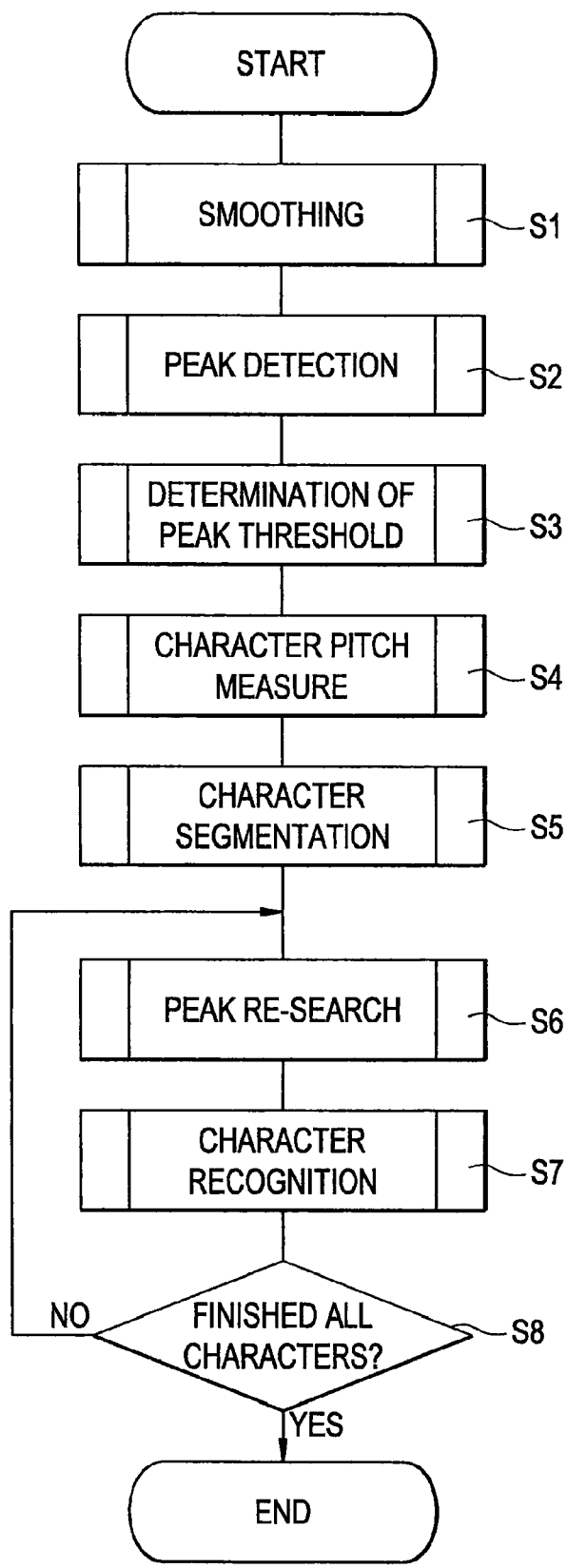
FIG. 3 is a flowchart showing a general workflow of a magnetic character recognition method in accordance with the embodiment of the present invention.

FIG. 3 is a flowchart showing a general workflow of a magnetic character recognition method in accordance with the embodiment of the present invention.

As shown in FIG. 3, smoothing operation is carried out at first in the magnetic character recognition method in accordance with the embodiment (Step S1). Specifically, an entire part of the MICR waveform is smoothed by means of a moving-average method and the like to remove high-frequency noise, so as to enable making a waveform comparison without bad influence by the noise.

Subsequently, peak detection is carried out (Step S2). Specifically, all peaks, namely all local maximum and minimum values, included in the MICR regeneration waveform are detected.

A positive peak is detected as an upward convex pattern. That is to say; where a signal output at the present point "t" is expressed as "Amp (t)" and a signal output at the next point is expressed as "Amp (t+1)", the difference between the two points is described as "$\Delta$ (t)=Amp (t+1)−Amp (t). Then, if "$\Delta$ (t)" is greater than 0 and "$\Delta$ (t+1)" is less than 0, it is determined that "Amp (t+1)" is a positive local maximum value. Meanwhile, a negative peak is detected as a downward convex pattern. That is to say; if "$\Delta$ (t)" is less than 0 and "$\Delta$ (t+1)" is greater than 0, it is determined that "Amp (t+1)" is a negative local maximum value (i.e., a local minimum value).

Such a positive peak and a negative peak appear alternately. Every time when a peak is detected; an index "t", a signal output "Amp (t)", and a polarity "Sgn" of the peak are saved. Incidentally, if one peak is formed with continuous output levels of the same value, the peak has a trapezoidal shape. In such a case, a beginning point and an end point of the flat peak part are calculated, and then a middle position between the two points is determined to be a peak point. Thus, a peak point can be detected accurately even when an MICR magnetic regeneration output of the check is saturated.

Subsequently, a peak threshold is determined (Step S3). The peak threshold is used for determining whether a peak included in the regeneration waveform is noise or a true peak. Even when a signal output value is assumed to be a peak, the signal is eventually determined to be noise if the signal output level does not reach the level of the peak threshold and the signal is not adopted in this case. As a result, this makes it possible to carry out magnetic character recognition with high accuracy, being free from bad influence by such noise.

Figure 4:
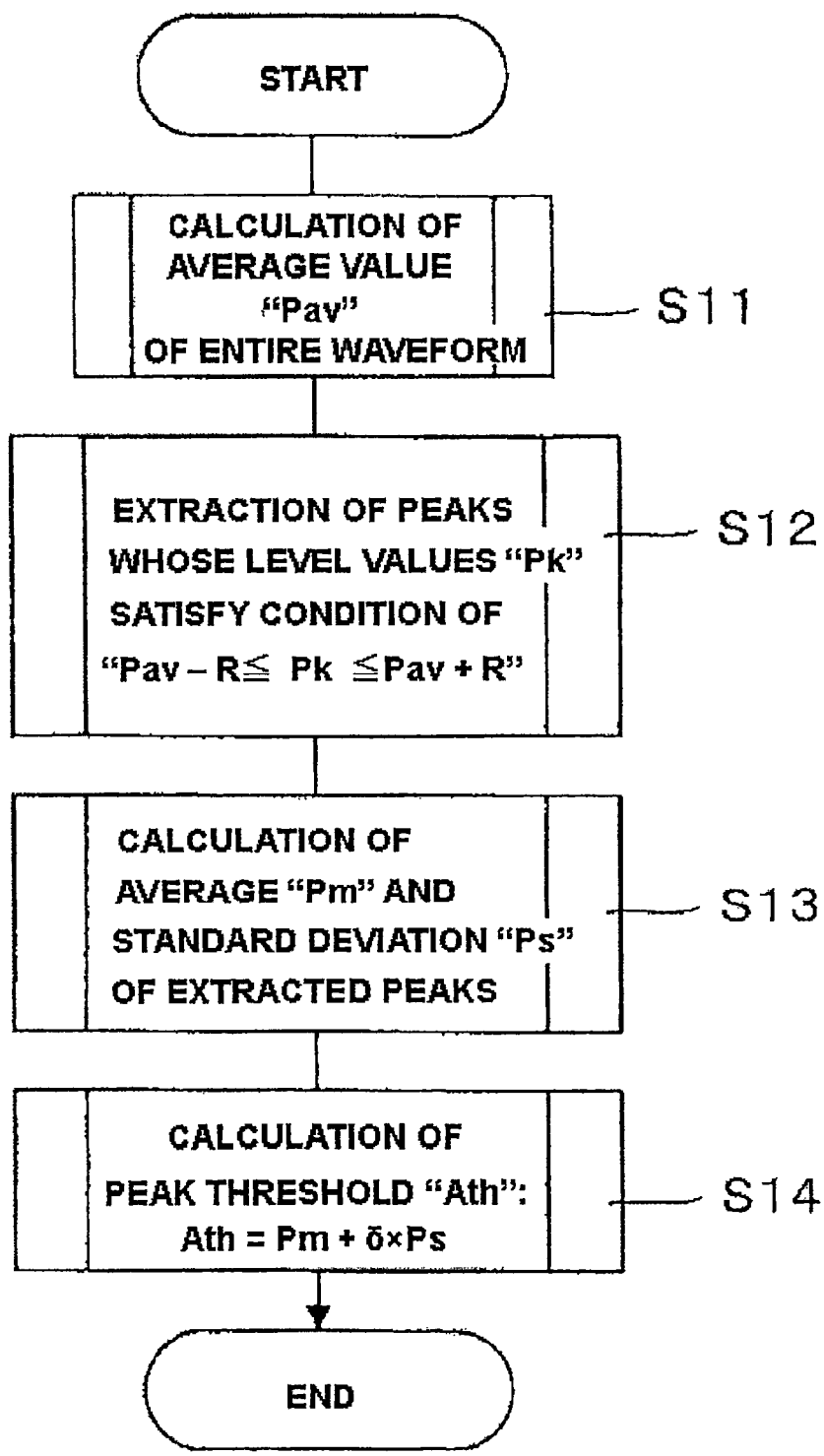
FIG. 4 is a flowchart describing details of operation of determining the peak threshold at Step S3 in FIG. 3.

FIG. 4 is a flowchart describing details of operation of determining the peak threshold at Step S3 in FIG. 3. In FIG. 4, an average value "Pav" of an entire part of the regeneration waveform is calculated (Step S11) at first. Among the peaks obtained through operation of the peak detection (Step S2 in FIG. 3), extracted are only the peaks whose level values "Pk" satisfy a condition of "Pav−R$\leq$Pk$\leq$Pav+R" (Step S12), where "R" is an appropriate value (>0). Then, an average "Pm" and a standard deviation "Ps" of the values of the extracted peaks are calculated (Step S13). Preferably, an appropriate value is adopted for the value "R", taking into account the characteristics of the magnetic regeneration circuit system.

Finally, the peak threshold "Ath" is calculated by using a formula "Ath=Pm+δ×Ps" (Step S14). A value "3" or "4" is adopted for the value "δ". Accordingly, the peak threshold can be appropriately determined, being free from bad influence by fluctuation of signal levels.

As described above; for determining the peak threshold "Ath" in the flowchart of FIG. 4, all peak values included in the regeneration waveform are calculated. Then, the variance (or the standard deviation) of the values of the peaks, which exist within a certain range in relation to the average value of the regeneration waveform, is calculated; and the peak threshold is determined, being based on the variance value (or the standard deviation value).

Though the standard deviation value is used for determining the peak threshold "Ath" in the present embodiment, another value may be used instead. Namely, depending on whether there exists any peak having intensity greater than a specified intensity level within a range for one character or not, it may be determined whether an objective part of the regeneration waveform is dealt with as a character region or a region with no signal.

Then, as shown in FIG. 3, character pitch measure processing (Step S4) is carried out. This processing operation is an example of a character pitch measuring process for calculating the average character width and the average character period of each character by using the result of the peak detection processing operation (Step S2) described above. The processing operation is concretely explained by referring to FIG. 5, which is a flowchart showing a workflow of the character pitch measure processing.

Figure 5:
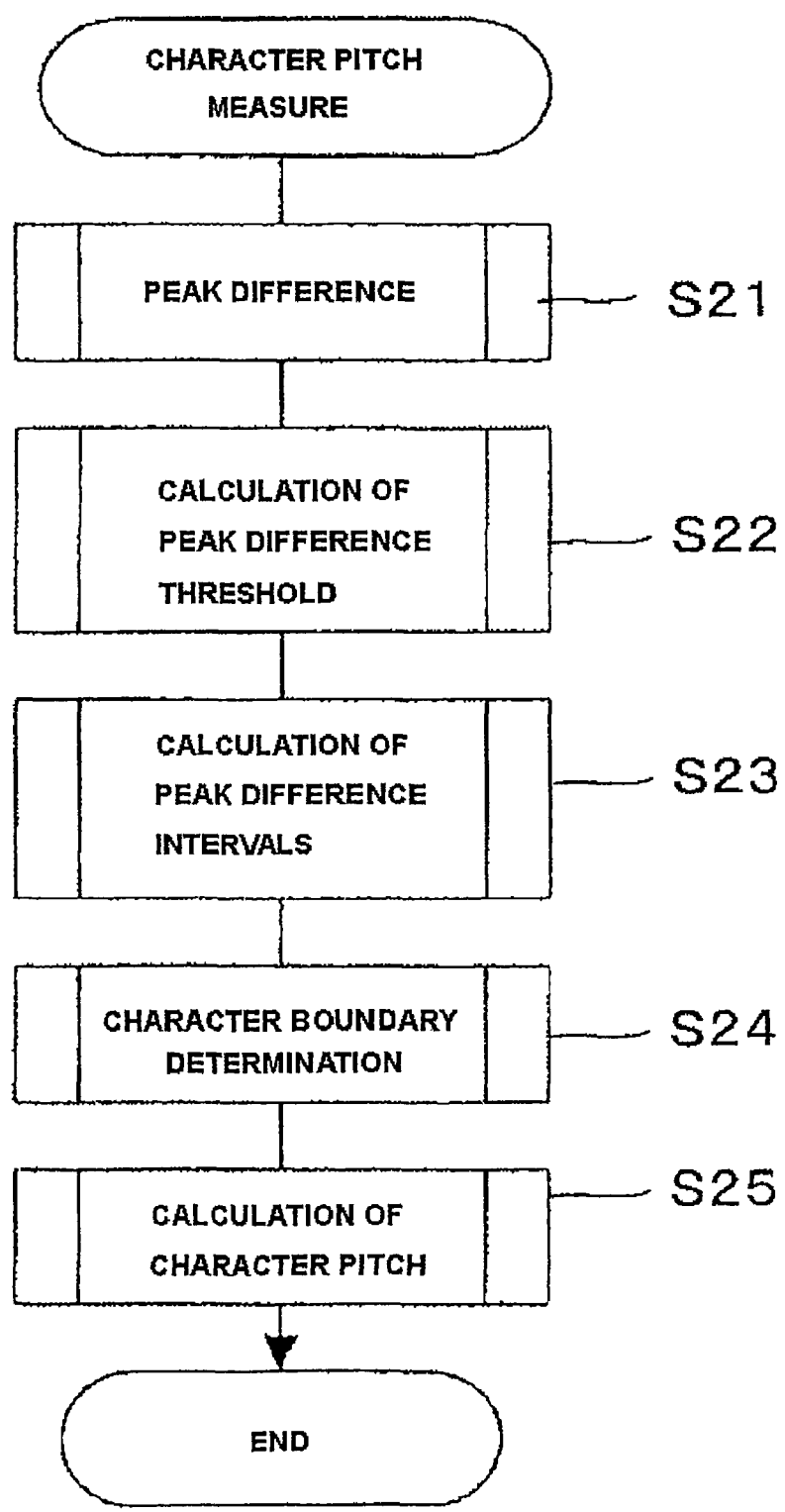
FIG. 5 is a flowchart showing a workflow of the character pitch measure processing.

For the processing operation shown in FIG. 5, it is assumed that a series of peaks "Pk" for example shown in FIG. 6A is already obtained through the peak detection (Step S2 shown in FIG. 3) described above. By using the data of "Pk", peak difference (values) "Pkd" are calculated as "Pkd(i)=Pk(i)−Pk(i−1)" (Step S21: Refer to FIG. 6B).

Then, a peak difference threshold (a threshold for peak separation) is calculated (Step S22). In detail to describe the threshold for peak separation; when an appropriate threshold "kt" shown in FIG. 6B is defined for the series of negative-side peaks of "Pkd", noise peaks around the DC offset and true signal peaks can appropriately be separated from each other. Namely, positions of peaks included in a character can be obtained with high accuracy, and therefore the character period can accurately be calculated. Thus, a key point of the magnetic character recognition method relating to the present embodiment is to reasonably calculate the threshold for peak separation "kt".

Figure 7A:
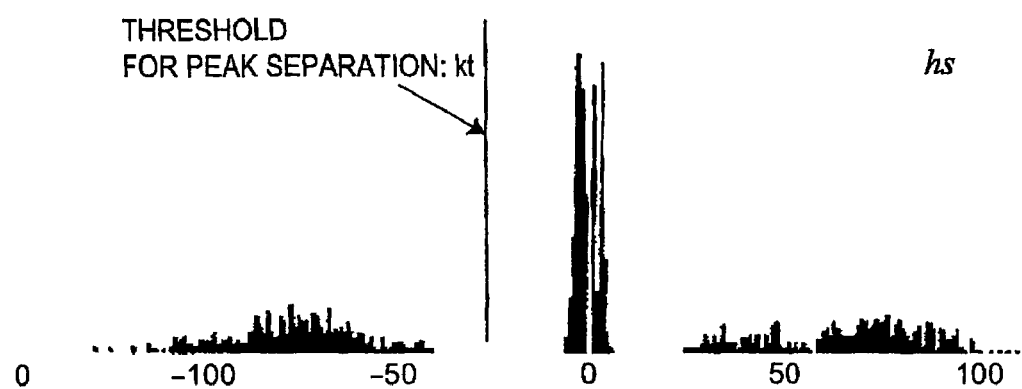
FIGS. 7A and 7B show a histogram "hs" and a cumulative frequency "cs" of the peak difference values.
Figure 7B:
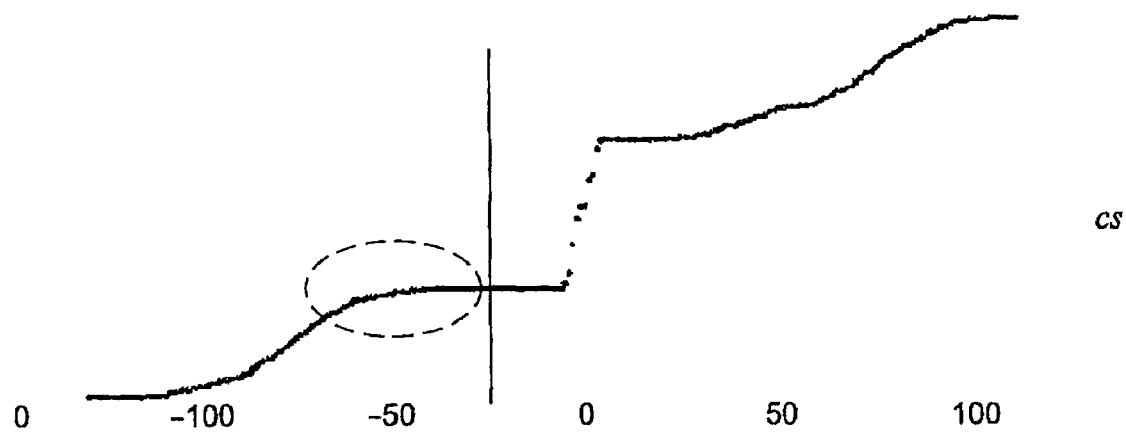

The threshold for peak separation "kt" is calculated as described below. At first, a histogram "hs" and a cumulative frequency "cs" of the peak difference values are calculated as shown in FIG. 7A and FIG. 7B, respectively. In the histogram "hs" of FIG. 7A, a section having its frequency of "0" is found between a center heap and a left heap, and the threshold "kt" is defined as a midpoint between the section for enabling separation of the noises and true signals. Thus, using the histogram of the peak difference values "hs" also makes it possible to calculate the average character width and the average character period of each character.

Figure 8:
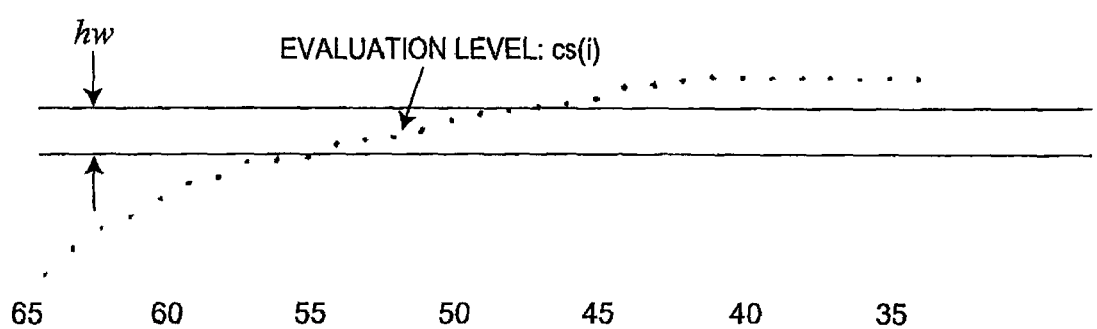
FIG. 8 shows a magnified view of an objective part (a part surrounded by a dotted line in FIG. 7B) in the cumulative frequency "cs" (cumulative frequency distribution) that FIG. 7B shows.

However, depending on condition of reading a waveform of a magnetic regeneration signal, sometimes the signal/noise ratio may be so bad that the section having its frequency of "0" does not exist distinctly. In such a case, the problem is dealt with as described below. FIG. 8 shows a magnified view of an objective part (a part surrounded by a dotted line in FIG. 7B) in the cumulative frequency "cs"(cumulative frequency distribution) that FIG. 7B shows. Where a cumulative frequency at a certain point "i" is specified as an evaluation level "cs(i)", a flatness at the point "FLT" is defined with the formulas described below:

$$A = \{cs(k) | cs(k) \geq cs(i) - bw/2 \text{ and } cs(k) \leq cs(i) + bw/2;$$
$$k=1, \ldots nk; i=1, \ldots ni\}, FLT(i)=n(A)$$

Figure 9:
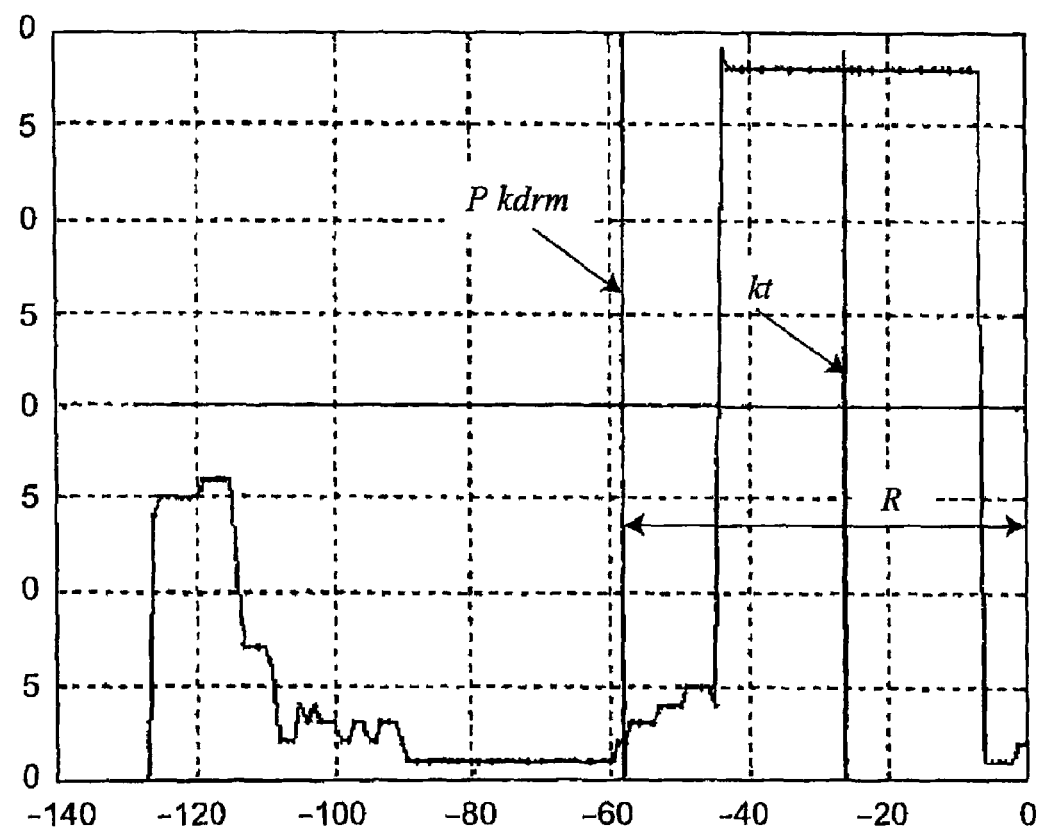
FIG. 9 shows the flatness "FLT" obtained by using the data of "cs" shown in FIG. 8.

Namely, at the evaluation level "cs(i)", the flatness "FLT" is the number of points of the "cs" included in a band range "bw" limited by lower and upper limits; which are "cs(i)−bw/2" and "cs(i)+bw/2", respectively; and the limits sandwiching the evaluation level. The greater the number of points is, the more the flatness at the evaluation level is. In FIG. 9, the flatness "FLT" is obtained by using the data of "cs(i)" shown in FIG. 8. The threshold "kt" is defined at a point where the maximum value of "FLT" is given so as to bring the greatest value for the flatness.

Incidentally, the flatness "FLT" generally has two local maximum values. Therefore, if searching operation for the maximum value is carried out through the entire range, there arises a chance that a wrong point is defined for the threshold "kt". To avoid such a mis-determination, the variable range of "i" for calculating the maximum value is restricted. Concretely to describe, an RMS value of peak difference values "Pkdrms" is calculated, and then a range of searching operation for the maximum value is specified to be "−Pkdrms≦i≦0". The RMS value of peak difference values "Pkdrms" is calculated by using a formula described below.

$$Pkdrms = \sqrt{\frac{\sum_{i}^{N} Pkd(i)}{N}} \quad \text{(Formula 1)}$$

The range of searching for the maximum value is specified as "R" shows in FIG. 9, and there is no chance of defining a wrong point for the maximum value. Furthermore, in case where a local maximum value of the flatness "FLT" exists for a certain width, both edges of the constant value level of the flatness "FLT" are searched for, and the threshold "kt" is defined at a midpoint of both the edges. Thus, the wider the flat level of the flatness "FLT" is, the better the noises and signal peaks are separated. Therefore, it is possible to devise a configuration provided with a self-controlling function of reliability of magnetic character recognition results by making use of the flatness of the cumulative frequency distribution of peak difference values as an index for the level of readability.

Figure 10:
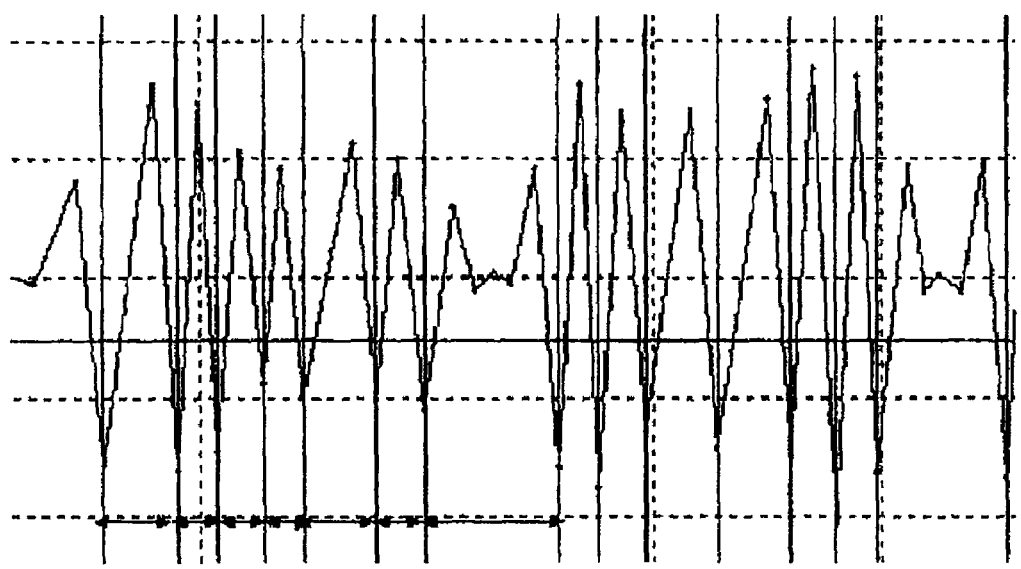
FIG. 10 is a drawing that explains calculation of peak difference intervals.

Then, as shown in FIG. 5, peak difference intervals are calculated (Step S23). As shown in FIG. 10, with respect to negative side values "Pknd" of the peak difference values "Pkd", all peaks whose difference values are less than the threshold for peak separation "kt" are picked up. Then, a distance between every two neighboring peaks "Dx(i)" is calculated to create an array of the peak (difference) intervals "Dx". Namely, the array of the peak (difference) intervals "Dx" is defined as a formula shows below:

$$Dx(i)=Px(i+1)-Px(i); \text{ wherein } Pknd(i+1)<kt, \text{ and } Pknd(i)<kt$$

Subsequently, a processing operation of character boundary determination is carried out (Step S24). In the processing operation, the peak interval values are scanned from their forefront to find a maximum value from each group of 7 straight interval values. Then, the maximum value is regarded as corresponding to an inter-character space so as to segment a character. The processing operation repeats until all the peak interval values are scanned. A concrete example is described by using Table 1 shown below.

TABLE 1

| i | Px (i) | Dx (i) | m | Psp (m) | Pep (m) | Charwid (m) | Gap (m) |
|---|--------|--------|---|---------|---------|-------------|---------|
| 1 | 2979 | 16 | 1 | 2979 | 3050 | 71 | 29 |
| 2 | 2995 | 9 | 2 | 3079 | 3149 | 70 | 29 |
| 3 | 3004 | 10 | 3 | 3178 | 3249 | 71 | 30 |
| 4 | 3014 | 9 | 4 | 3279 | 3349 | 70 | 29 |
| 5 | 3023 | 16 | 5 | 3378 | 3448 | 70 | 30 |
| 6 | 3039 | 11 | 6 | 3478 | 3549 | 71 | 29 |
| 7 | 3050 | 29 | 8 | 3578 | 3648 | 70 | 29 |
| 8 | 3079 | 9 | 7 | 3677 | 3748 | 71 | 29 |
| 9 | 3088 | 10 | 8 | 3777 | 3848 | 71 | 29 |
| 10 | 3098 | 16 | 9 | 3877 | 3947 | 70 | 30 |
| 11 | 3114 | 16 | 10 | 3977 | 4047 | 70 | 29 |
| 12 | 3130 | 10 | 11 | 4076 | 4146 | 70 | 30 |
| 13 | 3140 | 9 | 12 | 4176 | 4246 | 70 | 129 |
| 14 | 3149 | 29 | | ... | ... | ... | ... |
| | ... | ... | | | | | |

In a left section of Table 1 above, a seventh value "Dx (7)"=29 is a maximum value. Therefore, it is considered that the position corresponds to a space between the first character and the second character. In other words, the first character ends at the 7th value, and the second character starts from the 8th value. The 1st to 7th elements in the left section of Table 1 correspond to a 1st element in a right section of Table 1. In the right section of Table 1; "Psp(m)", "Pep(m)", "Charwid (m)", and "Gap(m)" show a start position, an end position, a width, and a width of the inter-character space, of the m-th character, respectively.

Finally, character pitch calculation is carried out (Step S25). In the character pitch calculation, an average character width and an average character pitch are calculated according to data of the right section of Table 1 shown above. An average character width "CHARWID" may be either an average or a median of the "Charwid(m)" values of the right section of Table 1, and it may be chosen according to convenience of the actual configuration. A median is chosen for the use in the present embodiment, and it brings an advantage that effect of any extraordinary value can be suppressed to a low level. A average character pitch "PITCH" is calculated as either an average or a median of the "Psp(m+1)−Psp(m)" values.

Figure 11:
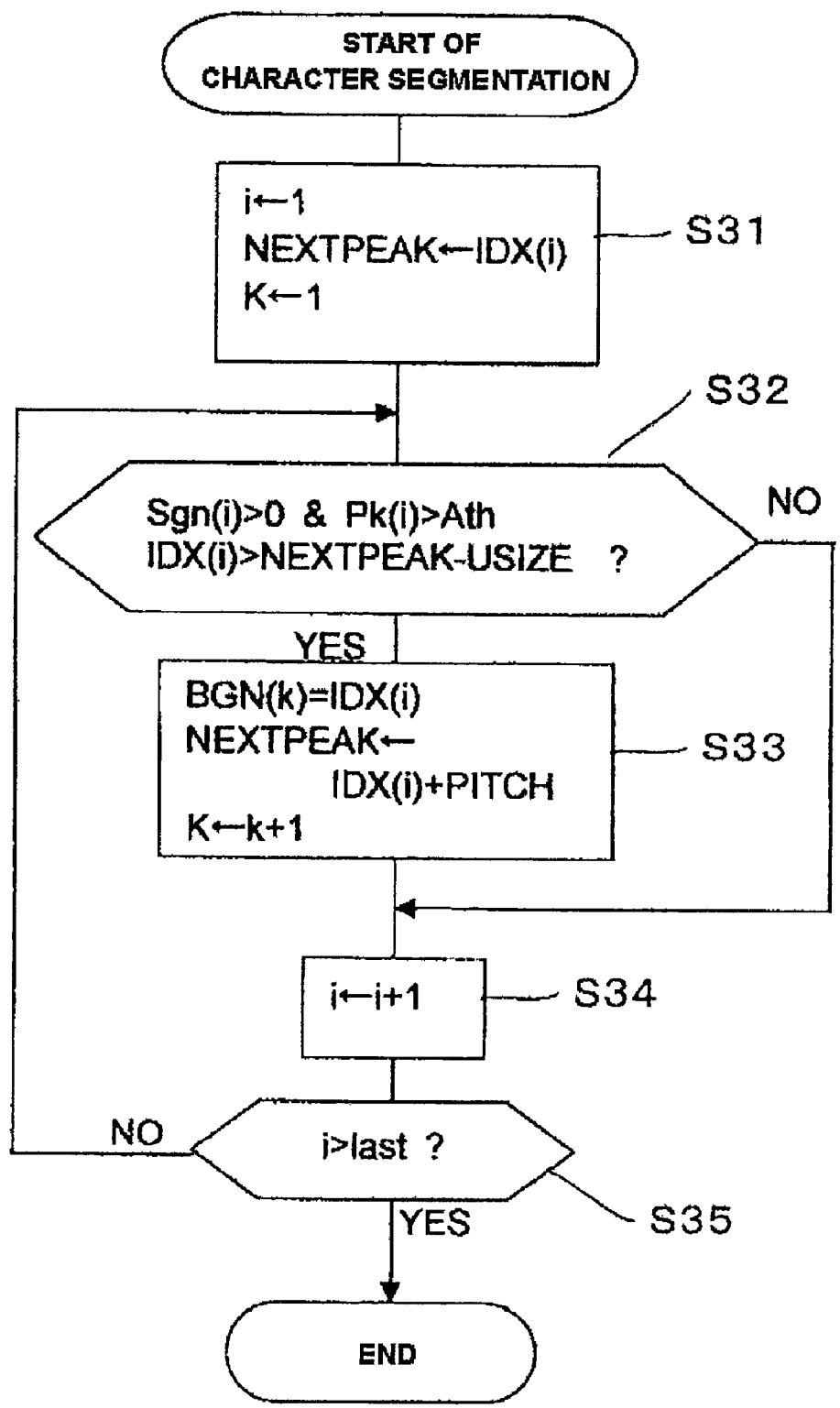
FIG. 11 is a flowchart showing a detailed workflow of the character segmentation described in the flowchart of FIG. 3.
Figure 12:
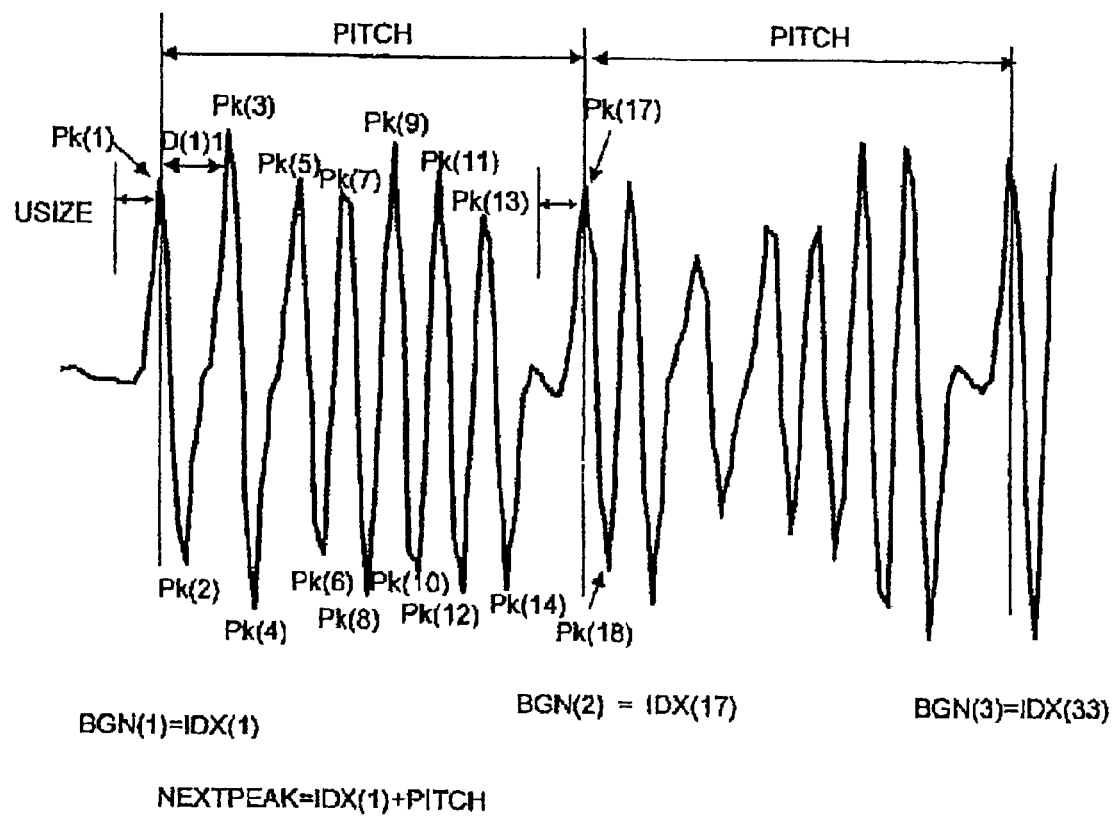
FIG. 12 is a drawing that illustrates an example of the MICR regeneration waveform data.

Subsequently, as shown in FIG. 3, character segmentation is carried out (Step S5). FIG. 11 is a flowchart showing a detailed workflow of the character segmentation (Step S5) described in the flowchart of FIG. 3. Meanwhile, FIG. 12 illustrates an example of the MICR regeneration waveform data. A characteristic point of the magnetic character recognition method relating to the present embodiment is a fact that the method does not use any fixed-length frame as a frame for character determination, but makes use of the character pitch obtained through the character pitch calculation process (Step S25 in FIG. 5) described above. Since the character pitch is calculated according to a waveform objective for the operation, it is possible to reduce a chance of any mis-determination on character boundaries. In the character segmentation, a forefront peak position of each character is detected at first. According to the standard specifications on MICR character printing, the forefront peak position of each character is defined to be a major peak having a positive polarity and an output value of a prescribed level or higher. Therefore, the MICR regeneration waveform is scanned from its beginning, and it is determined whether or not the level value at the peak "Pk" is a positive value being greater than the peak threshold "Ath". To specify the peak threshold "Ath", for example, an average of all positive peak values is calculated. Then, for example, a 60% value of the average is set as the threshold "Ath".

In FIG. 11, "1" is substituted into the variables "i" and "k", and meanwhile a position index "IDX (i)", namely "IDX (1)", is substituted into "NEXTPEAK" (Step S31). When the level value "Pk (i)" is positive (The polarity function "Sgn (i)" is used to detect whether the value is positive or negative) and is greater than the peak threshold "Ath", it is determined whether or not the position index "IDX (i)" is greater than a value "NEXTPEAK−USIZE" (Step S32). If the position index is not greater than the value "NEXTPEAK−USIZE", it is determined that the position index "IDX (i)" at the time is not a character segmentation part. Then, after incrementing the variable "i"(Step S34), the operation returns to Step S32 and this cycle repeats until the variable "i"reaches "last".

On the contrary, if the position index "IDX (i)" is greater than the value "NEXTPEAK−USIZE" (i.e., the position index indicates a further advanced position than "NEXTPEAK−USIZE", and the level value "Pk (i)" is positive and greater than the peak threshold "Ath"), it is determined that the position index "IDX (i)" at the time is a character segmentation part. Then, the position index "IDX (i)" is substituted into "BGN (k)" (Step S33). Meanwhile, "IDX (i)+PITCH (Character interval)" is substituted into "NEXTPEAK" and the variable "k" is incremented for 1. Thus, the position index "IDX (1)" at "Pk (1)" shown in FIG. 12 is substituted into "BGN (1)", and the position index "IDX (17)" at "Pk (17)" shown in FIG. 12 is substituted into "BGN (2)". The same operation is repeated for "BGN (3)" and later.

Thus, detecting a forefront peak position of each character is repeated. At the time of exceeding an end of the MICR character waveform (Step S35: YES), the character segmentation quits. Incidentally, "USIZE" described above indicates how many points shall exist before the forefront peak for the character waveform segmentation. In other words, standard waveform data are generated in such a manner that a first peak is placed at a position of "USIZE-th" from the beginning. Therefore, a segmentation start point is to be placed at a position of "USIZE-th" before the forefront peak, and then a waveform having the same length as the length of the standard waveform is segmented.

At Step S32 in FIG. 11, until the position index "IDX (i)" reaches the value "NEXTPEAK(−USIZE)", each peak at the time is detected and the distance between the neighboring two peaks is sequentially memorized. On this occasion, the distance calculation between the neighboring two peaks is carried out only in terms of either positive peaks or negative peaks.

Thus, detecting a forefront peak position of each character and calculating the distance between the neighboring two peaks are repeated. At the time of exceeding the end of the MICR character waveform, the character segmentation quits. Incidentally, the processing operation; in which a peak interval array for each character is created at first through the processing operation of character boundary determination (Step S4 in FIG. 3: Step S24 in FIG. 5) and then the character segmentation is carried out (Step S5 in FIG. 3); is an example of a character segmentation process in which a peak interval array for each character is created on the basis of an average character period.

Subsequently, as shown in FIG. 3, a processing operation of peak (re-)search (Step S6) is carried out. This processing operation (namely, it can also be called "the second peak search processing") is described in detail with respect to FIG. 13, which is a flowchart showing a workflow of the peak re-search processing. FIG. 14 shows a part of a character waveform. In a first character segmentation processing at first, only peaks which either exceed one threshold line or fall below the other threshold line are picked up, as shown in FIG. 14. As a result of it, positive side peak positions are [5870 5880 5890 5898 5924 5940], and the number of peaks is 6. Meanwhile, negative side peak positions are [5884 5894 5904 5928 5944], and the number of peaks is 5.

Figure 13:
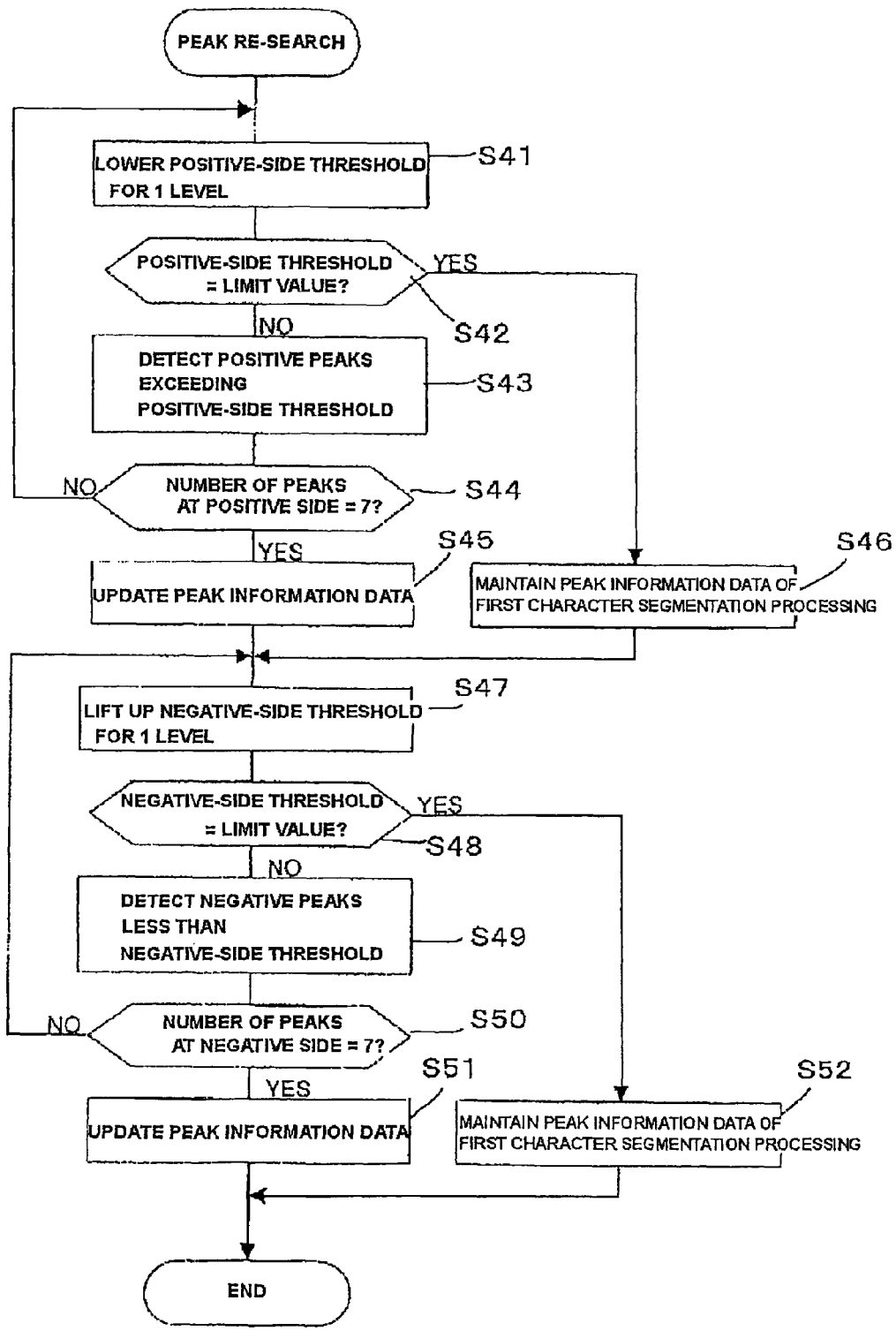
FIG. 13 is a flowchart showing a workflow of the peak re-search processing.
Figure 14:
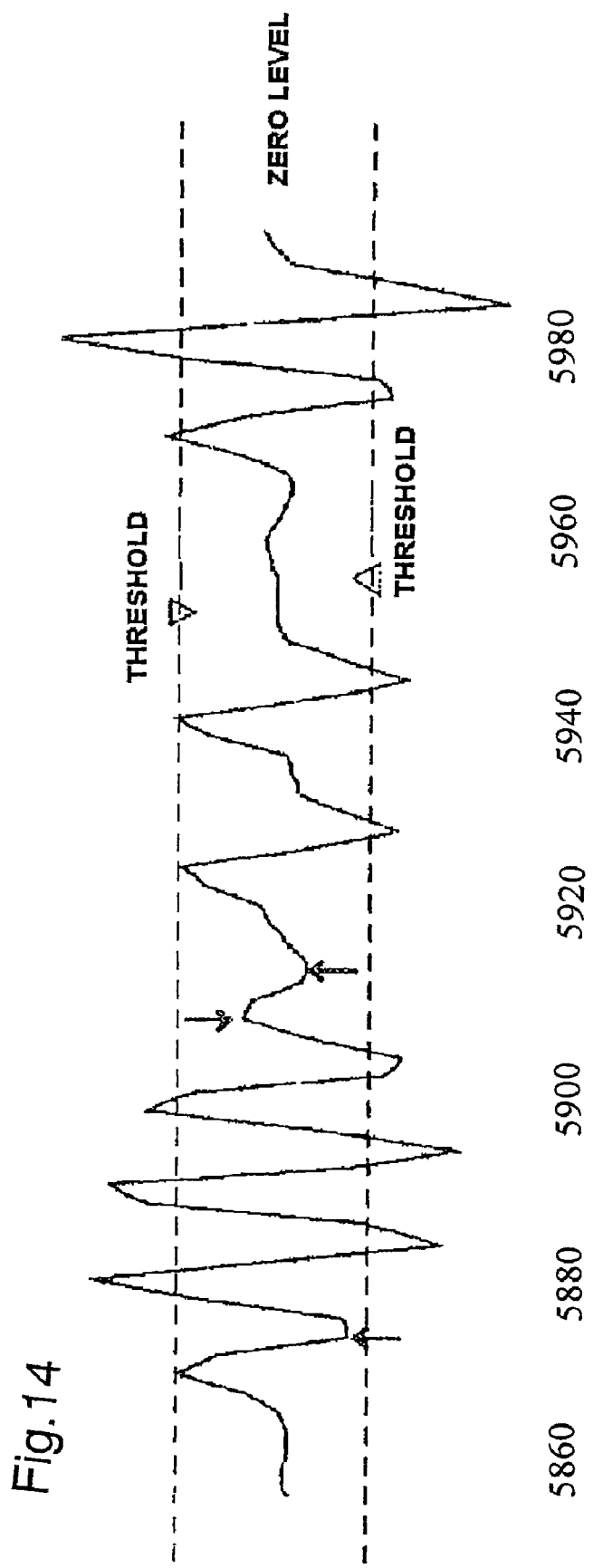
FIG. 14 shows a part of a character waveform.

As FIG. 13 shows, at first in the peak re-search processing, the positive-side threshold line of FIG. 14 is lowered step by step (for each one level) from the position shown in FIG. 14 toward the zero level (Step S41). Incidentally, if the positive-side threshold value has already reached the limit value (Step S42: YES), peak information data of the first character segmentation processing is maintained as it is (Step S46). Meanwhile, if the positive-side threshold value has not yet reached the limit value (Step S42: NO), positive peaks exceeding the positive-side threshold value are detected (Step S43) and it is determined whether or not the number of peaks has already become equal to 7 (Step S44). When the number of positive-side peaks exceeding the threshold value has become 7 (Step S44: YES), the processing operation quits and the peak information data is updated (Step S45).

The same processing operation is carried out for the negative-side peaks as well. Namely, the negative-side threshold line of FIG. 14 is lifted up step by step (for each one level) from the position shown in FIG. 14 toward the zero level (Step S47). Then, the number of negative-side peaks is counted each time; and when the number of negative-side peaks has become 7, the processing operation quits and the peak information data is updated (Steps S48 through S51). Incidentally, if the negative-side threshold value has already reached the limit value (Step S48: YES), the peak information data of the first processing is maintained as it is (Step S52).

Thus, in the case where both the numbers of peaks at the positive and negative sides do not reach 7, the peak information data of the first character segmentation processing is adopted. Otherwise, the result data of the peak re-search processing is adopted. In other words; in the case where the number of peaks of each waveform part reaches the specified number of peaks (7), the result of the peak re-searching process is adopted (the peak information data is updated: Step S45 and Step S51); meanwhile in the case where the number of peaks of each waveform part does not reach the specified number of peaks (7), the result of the character segmentation process is chosen (the peak information data of the first character segmentation processing is maintained: Step S46 and Step S52).

Information data processing shown in FIG. 13 includes: an example of a peak searching process in which peak positions are searched for by using conditions (for example, Step S41 in FIG. 13), different from those used in the character segmentation (Step S5 in FIG. 3), in each waveform part segmented through the character segmentation (Step S5 in FIG. 3); and an example of a peak count evaluation process (Step S45 and Step S46 in FIG. 13) in which either the result of the character segmentation process or the result of the peak re-searching process is chosen, depending on whether the number of peaks in each waveform part is the specified number of peaks (7) or not.

Subsequently, as shown in FIG. 3, a processing operation of character recognition is carried out (Step S7). In the case of CMC7 fonts, one character is composed of 7 bars and 6 spaces. As a result, peak interval data of one character consists of 6 elements.

Where distances between peaks in relation to the "i-th" character are expressed as Di1, Di2, Di3, Di4, Di5, and Di6, those distances are D11=Pk(3)−Pk(1), D12=Pk(5)−Pk(3), - - - , D16=Pk(13)−Pk(11) in the example of FIG. 12.

Figure 15:
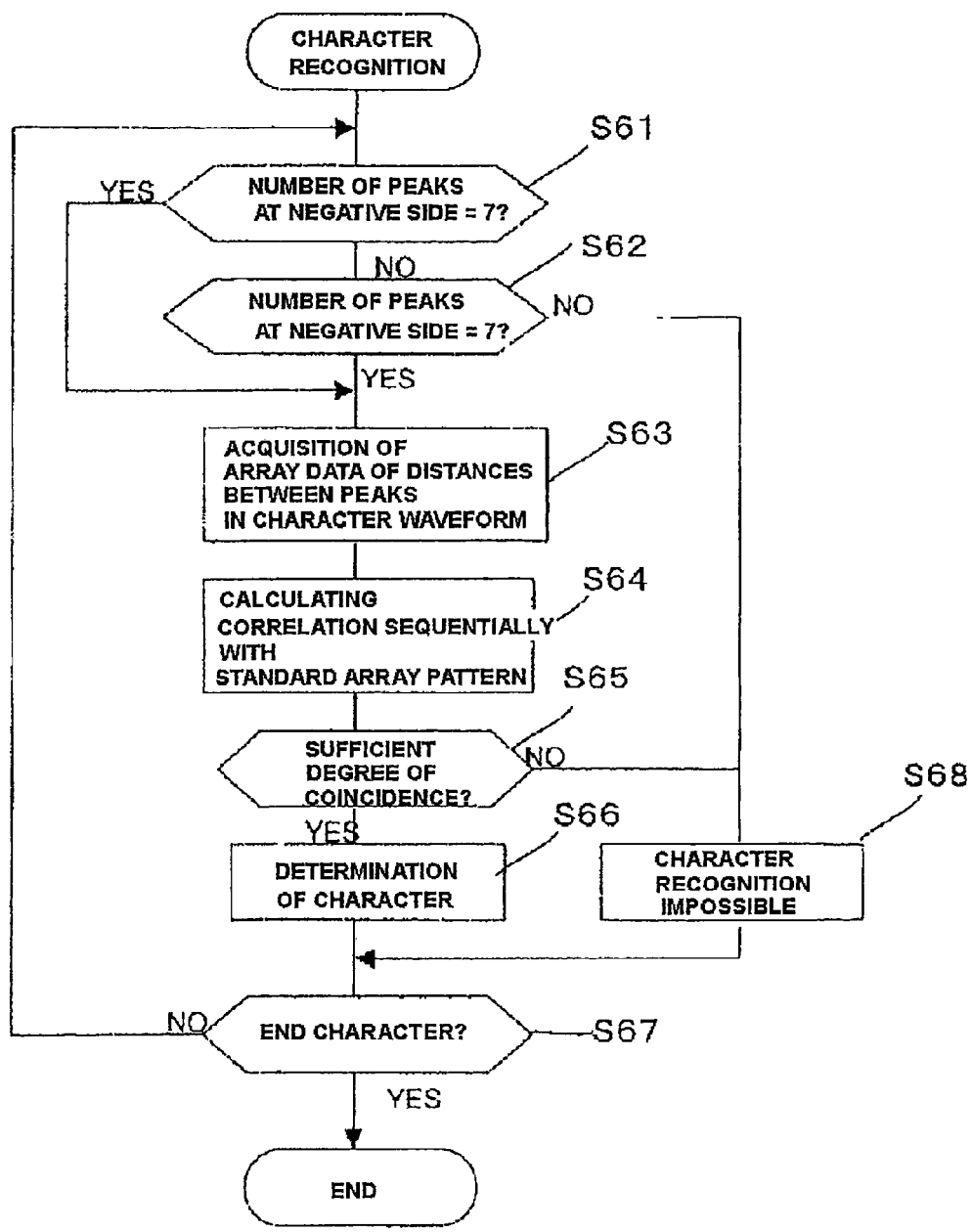
FIG. 15 is a flowchart showing a detailed workflow of the character recognition described in the flowchart of FIG. 3
Figure 16:
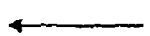
FIG. 16 is an example of a line of magnetic characters printed on a medium such as a check.

FIG. 15 is a flowchart showing a detailed workflow of the character recognition (Step S7) described in the flowchart of FIG. 3. Meanwhile, FIG. 16 is an example of a line of magnetic characters printed on a medium such as a check. The magnetic pattern is read in a direction from the right to the left in FIG. 16. The waveforms of magnetic regeneration signals read in such a manner are processed through the steps of the character segmentation described above. As a result, array data of the distances between neighboring two peaks shown below in "(Table 2)" is acquired (Step S63). Concretely to describe; if the number of positive-side peaks is 7 (Step S61: YES), the array data of the distances between neighboring two peaks is instantly acquired (Step S63). If the number of negative-side peaks is 7 (Step S62: YES) even though the number of positive-side peaks is not 7 (Step S61: NO), the array data of the distances between neighboring two peaks is acquired (Step S63). If both the numbers of positive-side and negative side peaks are not 7 (Step S61: NO and Step S62: NO), it is determined that the character cannot be recognized (Step S68).

TABLE 2

|   | 6   | 5   | 4   | 3   | 2   | 1   |
|---|-----|-----|-----|-----|-----|-----|
| 1 | D16 | D15 | D14 | D13 | D12 | D11 |
| 2 | D26 | D25 | D24 | D23 | D22 | D21 |
| 3 | D36 | D35 | D34 | D33 | D32 | D31 |
| . | .   | .   | .   | .   | .   | .   |
| . | .   | .   | .   | .   | .   | .   |
| i | Di6 | Di5 | Di4 | Di3 | Di2 | Di1 |
| . | .   | .   | .   | .   | .   | .   |
| . | .   | .   | .   | .   | .   | .   |
| n | Dn6 | Dn5 | Dn4 | Dn3 | Dn2 | Dn1 |

After acquiring the array data of the distances between neighboring two peaks shown in Table 2 through the processing operation of Step S63; for each character, the array data of the distances between neighboring two peaks is sequentially compared with each of an array data of a template (Standard array pattern) (Step S64) of Table 3 (See below) that is prepared beforehand. Incidentally, in the present embodiment, normalized correlation is used as a scale for coincidence (coefficient of coincidence).

TABLE 3

|      | 6 | 5 | 4 | 3 | 2 | 1 |
|------|---|---|---|---|---|---|
| 1    | 1 | 0 | 0 | 0 | 1 | 0 |
| 2    | 0 | 1 | 1 | 0 | 0 | 0 |
| 3    | 1 | 0 | 1 | 0 | 0 | 0 |
| 4    | 1 | 0 | 0 | 1 | 0 | 0 |
| 5    | 0 | 0 | 0 | 1 | 1 | 0 |
| 6    | 0 | 0 | 1 | 0 | 1 | 0 |
| 7    | 1 | 1 | 0 | 0 | 0 | 0 |
| 8    | 0 | 1 | 0 | 0 | 1 | 0 |
| 9    | 0 | 1 | 0 | 1 | 0 | 0 |
| 0    | 0 | 0 | 1 | 1 | 0 | 0 |
| SI   | 1 | 0 | 0 | 0 | 0 | 1 |
| SII  | 0 | 1 | 0 | 0 | 0 | 1 |
| SIII | 0 | 0 | 1 | 0 | 0 | 1 |
| SIV  | 0 | 0 | 0 | 1 | 0 | 1 |
| SV   | 0 | 0 | 0 | 0 | 1 | 1 |

For example, in the case of the forefront character (at the right end) in FIG. 16, peak interval data of the character is D1=(D16, D15, D14, D13, D12, D11). Then, a correlation coefficient "R (1, 1)" is calculated between D1 and the first data of the standard array pattern; i.e., "T1=(1, 0, 0, 0, 1, 0)" that expresses a numeral "1". (See the formula shown below)

$$R(1,1) = \frac{\sum_{i=1}^{6}(D_{1i} - \overline{D}_1)(T_{1i} - \overline{T}_1)}{\sqrt{\sum_{i=1}^{6}(D_{1i} - \overline{D}_1)^2 \sum_{i=1}^{6}(T_{1i} - \overline{T}_1)^2}} \quad \text{(Formula 2)}$$

wherein, $$\overline{D}_1 = \frac{\sum_{i=1}^{6} D_{1i}}{6} \quad \overline{T}_1 = \frac{\sum_{i=1}^{6} T_{1i}}{6}$$

Subsequently, a correlation coefficient "R (1, 2)" is calculated with "T2" that expresses a numeral "2". In the same manner, other correlation coefficients "R (1, t)" are calculated with each template data down to the symbol "SV". In the end, the maximum value among all the correlation coefficients "Rm=max(R(1, t))" is obtained, and then a character corresponding to "t" is the result of recognition.

Depending on whether "Rm" is greater or smaller than a prescribed value, it is determined whether the coincidence is sufficient or not (Step S65). If "Rm" is smaller than the prescribed value, it is determined that the waveform includes an error and the character cannot be recognized (Step S68). Contrarily, if "Rm" is greater than the prescribed value, the character is identified (Step S66). Instead of concluding at Step S68 that the character cannot be recognized, a further waveform analysis may be carried out while focusing on, for example, only character candidates having close similarity.

Thus, at Step S65; in other words, the array data of peak intervals and the standard array data of peak intervals are compared by using a correlation coefficient. When (for example, the greatest) correlation coefficient showing the highest coincidence is greater than the prescribed value, the read character is identified with the character corresponding to the correlation coefficient.

Next, it is determined if the character is the end character or not (Step 67). If the character is not the end character, the operation returns to Step S61. On the other hand; if the character is the end character, the sub-routine finishes.

As described above; in the present embodiment, a subsequent matching operation on the array data vector of distances between peaks is carried out (Step S64) for the side(s) where the number of peaks has become 7 (Step S61: YES and/or Step S62: YES). Namely, according to the peak interval array determined through the peak count evaluation process (the peak re-search processing shown in FIG. 13), a matching operation on the peak interval array is carried out to determine the character. If a score exceeds a threshold value at both the positive and negative sides, it is highly likely that one and the same character is matched at both the positive and negative sides. When the number of peaks is less than a threshold at either of the sides, the side with a score having exceeded the threshold is applied. When the score is less than the threshold at both the positive and negative sides; the character is dealt with as an unreadable one, or a correlated character is adopted only if the character correlated with for the best score is the same at both the positive and negative sides. A concrete method to be applied may be decided according to convenience of the character recognition system and the quality level of media.

Then, as the example of FIG. 14 shows, peak positions at the positive and negative sides are as described below: the positive side [5870 5880 5890 5898 5908 5924 5940] (A peak position of the 5th from the left end has been newly added, and it is indicated with an arrow in FIG. 14) and the negative side [5875 5884 5894 5904 5914 5928 5944] (Peak positions of the 1st and 5th from the left end have been newly added, and they are indicated with arrows in FIG. 14). The number of peaks is 7 at both the positive and negative sides. Accordingly, the array data vectors of distances between peaks are [10 10 8

10 16 16] and [9 10 10 10 14 16] at the positive side and negative side, respectively. In comparison with the standard data for '7' [0 0 0 0 1 1], these vectors result in the maximum scores 0.97 and 0.96. When the threshold is 0.8, both the scores exceed the threshold so that the character at the region is identified to be '7'.

As a scale for the similarity, a Sum-of-Absolute Difference may be used appropriately as required, in addition to the normalized correlation that is used in the present embodiment. Furthermore, though there are the standard specifications of E13-B and NC-7 for MICR characters, the present invention can be applied widely to any one of commonly-used MICR characters.

(Primary Advantageous Effect of the Embodiment)

As described above; the use of the magnetic character recognition apparatus 1 and the magnetic character recognition method in accordance with the present embodiment chooses optimal peak information data (out of two possible candidates) (Step S45 and Step S46 in FIG. 13) by taking notice of the number of peaks in each waveform part out of a regeneration waveform. Therefore, it is possible to recognize magnetic characters with high accuracy, even when the magnetic ink characters are printed, having their character pitch and character width that are unusual owing to uncertainties in printing condition.

Furthermore, since the average character width and the average character period are obtained by calculating the flatness "FLT" in the cumulative frequency distribution of peak difference values (Refer to FIGS. 7 and 8), signal elements can be separated more accurately from noise elements so that the accuracy of character recognition can be further enhanced. Moreover, making use of the difference processing on peak differences can prevent programs from becoming heavy-laded.

Though the characters printed on the medium are numerals and symbols in the present embodiment, alphabet characters may also be used in some cases depending on the type of media. In such cases, a ratio of wide peak intervals to narrow peak intervals in the characters is altered. Therefore, publicly known examples need to add the operational logic according to the alphabet characters. However, the present embodiment only needs to add a section for the alphabet characters to the standard data table of "(Table 3)" described above, and it can flexibly deal with variation of the objects for character recognition.

INDUSTRIAL APPLICABILITY

The method and apparatus for magnetic character recognition in accordance with the present invention are useful for enabling improvement in accuracy of the magnetic character recognition.

REFERENCE NUMERALS

1. Magnetic character recognition apparatus
11. Paper medium transfer path
12. Magnetizing head
13. Magnetic head
14. Rollers While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A method of magnetic character recognition through reading a character string by using a magnetic head, and creating a regeneration waveform for the character recognition; the character string including a plurality of magnetic characters printed with magnetic ink; and the method of magnetic character recognition comprising:
   a peak detection process for detecting peak positions in the regeneration waveform;
   a character pitch measuring process for calculating an average character width and an average character period of each character according to a detection result of the peak detection process;
   a character segmentation process for calculating a peak interval array for each character according to the average character period;
   a peak searching process for searching for peak positions by using searching conditions, which are different from what the character segmentation process applies, on each waveform part segmented through the character segmentation process;
   a peak count evaluation process for choosing either a result of the character segmentation process or a result of the peak searching process, depending on whether the number of peaks in the waveform part agrees with a prescribed number of peaks; and
   a character determining process for a matching operation on a peak interval array, according to the peak interval array determined through the peak count evaluation process, to determine the character.

2. The method of magnetic character recognition according to claim 1:
   wherein the character pitch measuring process calculates the average character width and the average character period by calculating peak difference values of the regeneration waveform and using a histogram of the peak difference values.

3. The method of magnetic character recognition according to claim 1:
   wherein the character pitch measuring process calculates the average character width and the average character period by calculating the peak difference values of the regeneration waveform and the cumulative frequency distribution thereof, and calculating a flatness of the cumulative frequency distribution.

4. The method of magnetic character recognition according to claim 1:
   wherein the peak count evaluation process chooses a result of the peak searching process if the number of peaks in the waveform part agrees with a prescribed number of peaks, and the peak count evaluation process chooses a result of the character segmentation process if the number of peaks in the waveform part does not agree with the prescribed number of peaks.

5. An apparatus for magnetic character recognition through reading a character string by using a magnetic head, and creating a regeneration waveform for the character recognition; the character string including a plurality of magnetic characters printed with magnetic ink; and the apparatus of magnetic character recognition comprising:

a peak detection section for detecting peak positions in the regeneration waveform;

a character pitch measuring section for calculating an average character width and an average character period of each character according to a detection result of the peak detection section;

a character segmenting section for calculating a peak interval array for each character according to the average character period;

a peak searching section for searching for peak positions by using searching conditions, which are different from what the character segmenting section applies, on each waveform part segmented through the character segmenting section;

a peak count evaluating section for choosing either a calculation result of the character segmenting section or a search result of the peak searching section, depending on whether the number of peaks in the waveform part agrees with a prescribed number of peaks; and a character determining section for a matching operation on a peak interval array, according to the peak interval array determined through the peak count evaluating section, to determine the character.

6. The method of magnetic character recognition according to claim 2:

wherein the peak count evaluation process chooses a result of the peak searching process if the number of peaks in the waveform part agrees with a prescribed number of peaks, and the peak count evaluation process chooses a result of the character segmentation process if the number of peaks in the waveform part does not agree with the prescribed number of peaks.

7. The method of magnetic character recognition according to claim 3:

wherein the peak count evaluation process chooses a result of the peak searching process if the number of peaks in the waveform part agrees with a prescribed number of peaks, and the peak count evaluation process chooses a result of the character segmentation process if the number of peaks in the waveform part does not agree with the prescribed number of peaks.

* * * * *